Patented Jan. 7, 1947

2,414,031

UNITED STATES PATENT OFFICE 2,414,031

PRODUCTION OF SECONDARY AMINES FROM NITROGEN COMPOUNDS

William S. Emerson, Dayton, Ohio

No Drawing. Application May 17, 1945, Serial No. 594,361

9 Claims. (Cl. 260—583)

The present invention relates to the reductive alkylation of amines, nitro, nitroso and azo compounds by means of aldehydes or ketones and hydrogen gas in the presence of a hydrogenation catalyst. The invention relates particularly to alkylation in the nitrogen-containing radical of the amino, nitro, nitroso or azo compound to produce N-alkyl or N-aralkyl substituted amines. The invention also relates to methods of controlling the proportion of secondary and tertiary amines produced in such reactions and is specifically directed to the production of secondary and tertiary amines.

The principal objects of the present invention are to provide a simple and economical method of obtaining N-alkylated or N-aralkylated amines by the reduction with hydrogen of an aldehyde or a ketone and an amine, nitro, nitroso, or azo compound or an intermediate condensation product of the specified carbonyl compounds and one of the nitrogen compounds. A further object is to provide a method of such reductive alkylation whereby good yield of secondary N-monoalkylated or tertiary N-dialkylated amines may be obtained at relatively low temperatures and relatively low pressures. Another object of the invention is to provide a method of such reductive alkylation of nitrogen compounds whereby the yield of secondary N-monoalkylated or tertiary N-dialkylated amines may be controlled to the extent of suppressing or entirely eliminating the formation of the undesired alkylated amines. Other objects and advantages of the invention, some of which are specifically referred to hereinafter, will be apparent to those skilled in the art.

This application is a continuation-in-part of my co-pending application Serial No. 370,355 filed December 16, 1940, now issued as U. S. Patent No. 2,380,420. In my application Serial No. 332,975 filed May 2, 1940, now issued as U. S. Patent No. 2,298,284, of which my co-pending application Serial No. 370,355 is a continuation-in-part, I have disclosed that by reducing a mixture of an aldehyde and a nitro or amino compound with hydrogen in the presence of a platinum or Raney nickel reduction catalyst under neutral or slightly alkaline reaction conditions, secondary amines are formed while the simultaneous formation of tertiary amines is suppressed or entirely avoided. Such neutral or slightly basic or alkaline conditions are obtained by placing in the reaction mixture undergoing hydrogenation an alkali-metal salt of a weak organic acid such as sodium acetate, sodium carbonate, sodium stearate or the like. I have also shown in my co-pending application Serial No. 370,355 and in my application Serial No. 332,975 that if acid conditions are maintained in a similar reaction mixture, for example, by the presence of trimethylamine hydrochloride in the reaction mixture, tertiary amines are formed to the exclusion or suppression of secondary amines.

I have discovered that in such reductive alkylation with nitrogen compounds and carbonyl compounds, that neutral or slightly basic reaction conditions maintained by the addition of sodium acetate or other alkali-metal salts of weak organic acids favor the formation of secondary amines while acid conditions maintained by the addition of trimethylamine hydrochloride, acetic acid or the like, favor the formation of tertiary amines.

Although I refer to neutral or basic and acid conditions or media throughout this specification, it is not to be understood that acidity or alkalinity in and of itself is directly responsible for the improvements specified. Sodium acetate, acetic acid or trimethylamine hydrochloride do change the pH or hydrogen-ion concentration of the reaction mixture but they probably act by virtue of their ability to favor certain condensation reactions or the like rather than as a result of their acidity. Sodium hydroxide, for example, which produces alkaline media, hinders reaction. Hence it is to be understood that when acid or basic media or conditions are referred to, these terms are used merely for convenience to classify the various kinds of condensing agents which are added to the reaction mixture.

I have also discovered that besides amines and nitro compounds, other nitrogen compounds such as nitroso and azo compounds, for example nitrosobenzene and azobenzene, may be used in the reactions. Furthermore, I have found that substitutents such as hydroxyl and amino radicals in the nitrogen compound have an activating effect on the reaction. Thus, when an aromatic nitrogen compound contains an amino or a hydroxyl group ortho, or particularly, para, to the nitro, amino, nitroso or azo group, the reductive alkylation of such substituted compound with ketones progresses more rapidly to the formation of secondary amines while with aldehydes, reaction is also accelerated and tertiary amines are formed in either basic or acid media. Alkyl groups substituted in the benzene ring also have a mild activating influence which is less pronounced than that of amino or hydroxyl groups, however. In the case of azo compounds, hydroxy or dimethylamine groups, either ortho or para to the azo group, have an activating influence and tertiary amines are formed in alkaline or acid media.

The methods of adopting the present discoveries and those of my co-pending application, Serial No. 370,355 and my application Serial No. 332,975, to the production of secondary or tertiary amines by reductive alkylation are set forth in the examples which follow hereinafter, but may be briefly summarized as follows:

A. Secondary amines may be made by the reaction of hydrogen in the presence of a hydrogenation catalyst on a reaction mixture comprising:

1. An unsubstituted nitrogen compound (nitro, amino, nitroso or azo compound) or such a nitrogen compound free from activating substituents such as amino or hydroxyl groups in the ortho or para position, together with an aldehyde, in an alkaline medium (activating substituents favor the formation of tertiary amines), or 2. A nitrogen compound containing activating substituents together with a ketone in an acid medium, or less favorably, in an alkaline medium, or 3. An unsubstituted nitrogen compound or a nitrogen compound free from activating substituents, as in 1, together with a ketone in an acid medium or in an alkaline medium under more drastic reaction conditions.

B. Tertiary amines may be made by the reaction of hydrogen in the presence of a hydrogenation catalyst on a reaction mixture comprising:

1. A nitrogen compound (nitro, amino, nitroso or azo compound), with or without activating substituents, together with an aldehyde in acid media, or 2. A secondary amine together with an aldehyde in an acid medium.

Ketones are inactive or are not as reactive as aldehydes in the formation of tertiary amines, either in acid or alkaline media, even under drastic reaction conditions. They may be advantageously used, however, in the production of secondary amines in accordance with the processes summarized above, especially when used in an acid instead of an alkaline medium. The reaction of primary aromatic amines with aldehydes, particularly formaldehyde, in acid media, is complicated by the formation of tarry condensation products of the type of anhydroformaldehyde-aniline and the like and hence, to avoid such formation of condensation products, resort should be made to primary aromatic nitro compounds or the like as starting materials; such condensation products do not readily form between primary aromatic amines and ketones or secondary aromatic amines and either aldehydes or ketones and hence reaction mixtures containing these compounds may be used. When formaldehyde is used in any reaction mixture under acid conditions, complications are also likely to result from polymerization of the formaldehyde. These complications do not result with acetaldehyde or higher aldehydes when used in the acid reaction mixtures contemplated by the present invention, however. The reductive alkylation product of formaldehyde and primary aromatic amines, furthermore, is a tertiary amine, in many cases, even in alkaline reaction media.

The yields in the foregoing alternative processes for the production of secondary or tertiary amines vary somewhat and hence one will be preferable to another. The processes also differ in the proportion of secondary or tertiary amines which are formed. By using ketones to prepare secondary amines, for example, it is possible to operate in such a manner that no substantial proportion of tertiary amine is formed as a by-product, which may be highly desirable, whereas in a reaction where the tertiary amine is the desired product it may be more economical to adopt an alternative which gives a high yield of tertiary amine that may be contaminated with small proportions of secondary amines in preference to one which gives a small yield of tertiary amine uncontaminated with secondary amines, since secondary amines can be converted in a separate subsequent step to tertiary amines.

It is known that secondary and tertiary amines have been prepared by reductive alkylation by the use of nascent hydrogen generated in situ from the reaction of a metal and an acid or by the use of hydrogen gas in the presence of a nickel catalyst at high temperatures (50 to 200° C.) and under high pressures (50 to 150 atmospheres). That such reactions could be conducted with hydrogen gas in the presence of a hydrogenation catalyst under relatively mild reaction conditions (room temperature and pressures of about 2 to 4 atmospheres) by the use of the specified acids or salts which modify the acidity (pH or hydrogen-ion concentration) of the reaction medium and serve as condensing agents or modify the reaction in some other manner, was unexpected.

By means of the processes of the invention it has been possible to prepare in an advantageous manner amines which have not been heretofore prepared or which could not be prepared by heretofore known methods. Since the methods disclosed herein show how alkylation may be stopped at the formation of the secondary amine the methods are useful for the preparation of tertiary amines having two different alkyl substituents on the amino nitrogen atom in an advantageous manner.

In the examples which follow, typical methods of practicing the process of my invention are set forth:

*Example I.—N-di-n-butylaniline using nitrobenzene, acid conditions and platinum catalyst*

Into the pressure bottle of a machine for catalytic reduction is placed a solution of 12.3 grams (0.1 mol) of nitrobenzene, 21.6 grams (0.3 mol) of butyraldehyde and 10 cc. of glacial acetic acid in 150 cc. of 95% ethyl alcohol. To this solution was then added 0.1 gram of platinum oxide catalyst prepared according to the method of Adams, Voorhees and Shriner ("Organic Syntheses," collective volume I, 1932, page 452) and the mixture was shaken on the machine for 96 hours during which time 0.66 mol of hydrogen was absorbed. After this hydrogenation the mixture was acidified with 17 cc. of dilute hydrochloric acid and the platinum catalyst was removed by filtration. The alcohol was evaporated from the filtrate, the residue was then made alkaline with sodium hydroxide and extracted with ether. The ether was removed from the ether extract and the product was distilled. The boiling range of the N-di-n-butyl-aniline was 265 to 275° C. and 14.5 grams of the product were obtained, which corresponds to a yield of 71%, based on the nitrobenzene. The product was further identified by means of its picrate, which had a melting point of 123 to 125° C. The melting point of the picrate is given as 125° C. by Reilly and Hickinbottom, J. Chem. Soc. of London, 1918, vol. 113, page 99.

*Example II.—Tertiary amines using nitro compounds, acid conditions and platinum catalysts*

Adopting the method of Example I, using glacial acetic acid to provide the acid medium and platinum catalyst and substituting the appropriate aldehyde and nitro compound, the following yields of the respective aliphatic and aromatic tertiary amines were obtained. (Melting points of derivatives used for identification purposes are listed in last column.)

| | | Per cent | | °C |
|---|---|---|---|---|
| 1 | N-diethylaniline | 77 | Picrate | 139–140 |
| 2 | N-di-n-propylaniline | 34 | Methiodide | 153–155 |
| 3 | N-diethyl-alpha-naphthylamine | 40 | Picrate | 152–154 |
| 4 | N-di-n-butylmethylamine | 56 | Hydrochloride | 131.0–131.5 |
| | | | Picrate | 86.0–87.5 |
| 5 | N-diethylmethylamine | 92 | ....do.... | 183–185 |
| 6 | N-di-n-propylmethylamine | 45 | ....do.... | 92–93 |

The properties of the respective amines thus prepared were as follows:

| | | Boiling range | Specific gravity (20°/20° C.) | Refractive index $n_D^{20}$ |
|---|---|---|---|---|
| 4 | N-di-n-butylmethylamine | 155–163° C | 0.782 | 1.4302 |
| 6 | N-di-n-propylmethylamine | 110–122° C | 0.743 | 1.4076 |
| 3 | N-diethyl-alpha-naphthylamine | 155–165° C./30 mm | 1.015 | 1.5961 |

*Example III.—N-di-n-butyl methylamine using nitromethane, n-butyraldehyde and acid medium*

Into a machine for catalytic reduction was placed a solution of 6.1 grams of nitromethane, 21.6 grams of n-butyr-aldehyde and 5 cc. of glacial acetic acid dissolved in 150 cc. of 95% alcohol. To this solution was then added 0.1 gram of platinum oxide catalyst. Hydrogen was passed into the mixture while the machine was shaking until 100.5 pounds of hydrogen had been taken up. The catalyst was then removed by filtration, the filtrate was acidified with hydrochloric acid and the alcohol was evaporated. To the residue was added 60 cc. of distilled water. The diluted residue was then extracted with two 25 cc. portions of ethyl ether. The aqueous layer was rendered basic with sodium hydroxide, and a brown layer was formed. The brown layer was extracted with three 25 cc. portions of ethyl ether. The extract was dried over solid sodium hydroxide. After removing the drying agent by filtration, the ether was distilled off and N-di-n-butyl methylamine was thereafter recovered by distillation. Boiling point 152–163° C. The product was redistilled and 8 grams of liquid product was collected at 155 to 163° C.;

$d_{20}^{20} 0.782 \quad n_D^{20} 1.4302$

The product was identified as the hydrochloride, melting point 131 to 131.5° C. and the picrate, melting point 86 to 87.4° C. Yield 56%.

*Example IV.—N-di-ethyl methylamine using nitromethane, acetaldehyde and acid medium*

Substituting 13.2 grams of acetaldehyde for the butyraldehyde of Example III and proceeding as therein otherwise indicated, with the exception that the product after ether extraction was dried over anhydrous magnesium sulfate, N-di-ethyl methylamine was obtained in 92% yield and was identified as the picrate having a melting point of 183 to 185° C.

*Example V.—N-di-n-propyl methylamine*

Substituting 17.4 grams of propyl aldehyde for the butyraldehyde of Example III, and in the presence of 10 cc. of glacial acetic acid, and proceeding as therein otherwise indicated, except that the ether extract was dried over anhydrous magnesium sulfate, N-di-n-propyl methylamine was obtained in 45% yield and was identified as the picrate having a melting point of 92 to 93° C.

The processes of the invention are applicable to the reductive alkylation of various nitrogen compounds, including aliphatic and aromatic amines such as methylamine, ethylamine, propylamines, butylamines, amylamines, dipropylamines, dibutylamines, diamylamines, propylbutylamines, propylamylamines, aniline, p-toluidine, p-anisidine, alpha-naphthylamine, beta-naphthylamine, phenylpropylamines (phenylaminopropanes) and the like, aliphatic and aromatic nitro compounds such as nitromethane, nitroethane, nitropropanes, nitrobutanes, nitropentanes, nitrobenzenes, nitrotoluenes, nitrophenols, nitroanisoles, chlorinated nitrobenzenes, nitronaphthalines, nitronaphthols, nitronaphthylamines, phenylnitropropanes and the like; aromatic nitrosoamines such as nitrosobenzene and the like; and azo compounds such as azobenzene and substituted azobenzenes such as N-dimethyl-p-aminoazobenzene, p-hydroxyazobenzene, 1-phenyl-azo-2-naphthol and the like. The nitrogen compounds may contain chlorine, alkoxy or aryloxy substituents, for example, chloroaminobenzenes, nitroanisoles, nitrodiphenyloxides and the like, which substituents have no substantial activating influence. However, when amino, hydroxy or alkyl substituents are present, as previously mentioned, the compound is activated as a result thereof.

Carbonyl compounds which may be used in the reaction include both aliphatic as well as aromatic aldehydes and ketones. Aldehydes are more reactive than ketones, as heretofore mentioned, and ketones in most cases cannot be used to effect alkylation beyond the formation of secondary amines. Examples of aldehydes and ketones which may be used in the processes are formaldehyde, acetaldehyde, propionaldehyde, butyraldehydes, pentaldehydes, hexaldehydes, heptaldehydes, benzaldehyde, acetone, ethyl methyl ketone, diethyl ketone, acetophenone, propiophenone and methyl phenyl diketone and the like. Generally branched-chain or arboraceous aldehydes and ketones do not react as readily as straight-chain compounds. Formaldehyde, as heretofore mentioned, may lead to complications.

Although I have referred to alkylation throughout this specification, it is to be understood that the term when used in the broad sense includes the introduction of aralkyl groups such as is effected by the use of benzaldehyde and the like, as well as alkyl groups. The process of the invention, however, finds its greatest applicability in the case of aliphatic aldehydes whose use in such reactions has not heretofore been possible in a facile manner.

Although I have particularly referred to reaction mixtures containing carbonyl compounds and nitrogen compounds as starting materials, condensation products of the two, or intermediate products of their reductive alkylation may be used.

As hydrogenation catalysts for the reduction, Raney nickel catalysts, platinum black, palladium black and platinum oxide and similar low-pressure hydrogenation catalysts are preferred. Catalysts such as copper chromite are not operative at the low temperatures and pressures contemplated by the present processes. When using acid conditions of reaction, platinum oxide catalysts are preferred to Raney nickel catalysts. With respect to choice of catalyst, it is also to be noted that certain hydrogenation catalysts are more sensitive to chlorine and sulfur compounds than others and hence if the compounds involved in any particular reaction contain halogen or sulfur substituents, proper selection of a catalyst to avoid complications should be made. The proportion of catalyst used for the reaction may be varied over a wide range, as illustrated in certain of the examples.

Acid conditions referred to in this specification may be obtained by the use of acetic acid and other weak organic acids, trimethylamine hydrochloride and similar salts of strong (mineral) acids and weak organic bases, containing no alkylatable hydrogen atoms attached to the nitrogen atom, preferably salts of tertiary amines. Mineral acids such as hydrochloric acid and the like cannot be used advantageously. Approximately 30 to 100 grams of glacial acetic acid, for example, to each mol of reacting nitrogen compound should be used.

The reactions may be carried out in various solvents. The examples illustrate the use of 95% ethyl alcohol and dioxane as a solvent but ethyl acetate, methyl alcohol, isopropyl alcohol, isopropyl ether and the like may be used. The essential requisite of the solvent is that it be inert in the reaction and that it dissolve the sodium acetate, trimethylamine hydrochloride or other agent used to facilitate the reaction.

The proportion of reactants in the reaction mixture is not of paramount importance. Generally the carbonyl compound should be in excess of that required by the particular reaction which it is desired to effect.

The temperatures which may be used in the reactions vary from normal room temperatures to approximately 100° C., although the preferred range is about 10 to 40° C. Generally the reaction will proceed without the addition of extraneous heat and with large batches cooling may be desirable to control the reaction. Likewise, the pressures may be varied greatly, for example, from normal atmospheric pressure to 10 or more atmospheres. Preferred pressure conditions, however, are from 2 to 4 atmospheres.

As used herein and in the claims the term "weak organic acid" is to be understood to signify monocarboxylic aliphatic acids such as acetic acid, formic acid, propionic acid, butyric acid, dicarboxylic and polycarboxylic acids and the like and to distinguish from strong organic acids such as benzene-sulfonic acids and similar non-carboxylic acids and mineral acids.

Inasmuch as the foregoing description comprises preferred embodiments of the invention, it is to be understood that my invention is not to be limited thereto and that modifications and variations may be made therein to adapt the invention to other specific uses without departing substantially from its spirit or scope as defined in the appended claims.

I claim:

1. In the method of producing an N-alkylated organic compound by the hydrogenation in the presence of a hydrogenation catalyst of a mixture of two compounds, one of which is an aliphatic nitro compound and the other of which is an aldehyde, the improvement comprising conducting the hydrogenation in the presence of a condensing agent consisting of a weak organic acid at a temperature within the range of approximately 15 to 100° C. and at a pressure of approximately 1 to 4 atmospheres.

2. The process as defined in claim 1 in which the condensing agent is acetic acid.

3. The process as defined in claim 1 in which the hydrogenation catalyst is of the platinum oxide type.

4. The process of producing an N-butylated tertiary aliphatic amine comprising the hydrogenation of a mixture of an aliphatic nitro compound and a butyraldehyde in the presence of a hydrogenation catalyst and a condensing agent consisting of acetic acid at a temperature within a range of approximately 15 to 100° C. and at a pressure of approximately 1 to 4 atmospheres.

5. The process of producing an N-ethylated tertiary aliphatic amine comprising the hydrogenation of a mixture of an aliphatic nitro compound and acetaldehyde in the presence of a hydrogenation catalyst and a condensing agent consisting of acetic acid at a temperature within the range of approximately 15 to 100° C. and at a pressure of approximately 1 to 4 atmospheres.

6. The process of producing an N-propylated aliphatic tertiary amine comprising the hydrogenation of a mixture of an aliphatic nitro compound and a propyl aldehyde in the presence of a hydrogenation catalyst and a condensing agent consisting of acetic acid at a temperature within the range of approximately 15 to 100° C. and at a pressure of approximately 1 to 4 atmospheres.

7. The process of producing N-di-n-butyl methylamine comprising the hydrogenation of a mixture of n-butyraldehyde and nitromethane in the presence of a hydrogenation catalyst and acetic acid at a temperature within the range of approximately 15 to 100° C. and at a pressure of approximately 1 to 4 atmospheres.

8. The process of producing N-diethyl methylamine comprising the hydrogenation of a mixture of acetaldehyde and nitromethane in the presence of a hydrogenation catalyst and acetic acid at a temperature within the range of approximately 15 to 100° C. and at a pressure of approximately 1 to 4 atmospheres.

9. The process of producing N-di-n-propyl methylamine comprising the hydrogenation of a mixture of n-propyl aldehyde and nitromethane in the presence of a hydrogenation catalyst and acetic acid at a temperature within the range of approximately 15 to 100° C. and at a pressure of approximately 1 to 4 atmospheres.

WILLIAM S. EMERSON.